Figure 3:
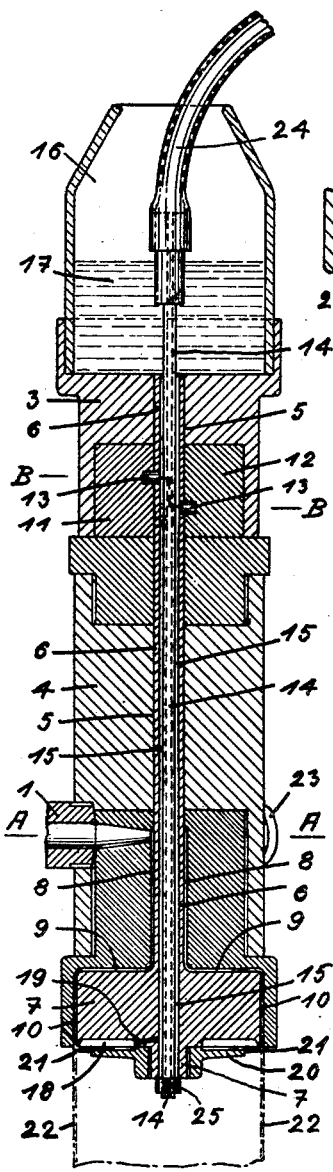

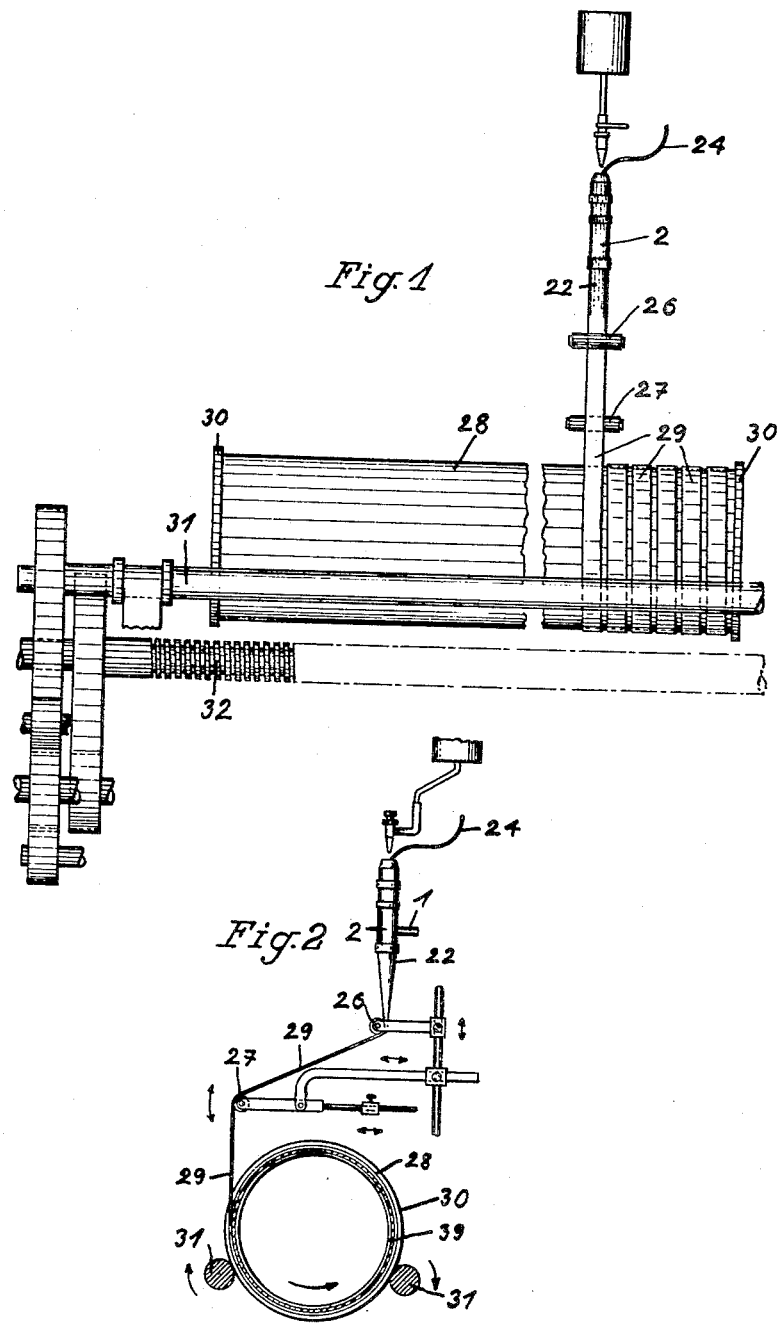

Sept. 14, 1954  G. J. HUCKFELDT  2,688,766
METHOD AND APPARATUS FOR PRODUCING AND
DRYING SYNTHETIC SAUSAGE CASINGS
Filed Feb. 17, 1950  3 Sheets-Sheet 2

Inventor:
G. J. Huckfeldt
by A. B. Foster
attorney

Sept. 14, 1954  G. J. HUCKFELDT  2,688,766
METHOD AND APPARATUS FOR PRODUCING AND
DRYING SYNTHETIC SAUSAGE CASINGS
Filed Feb. 17, 1950  3 Sheets-Sheet 3
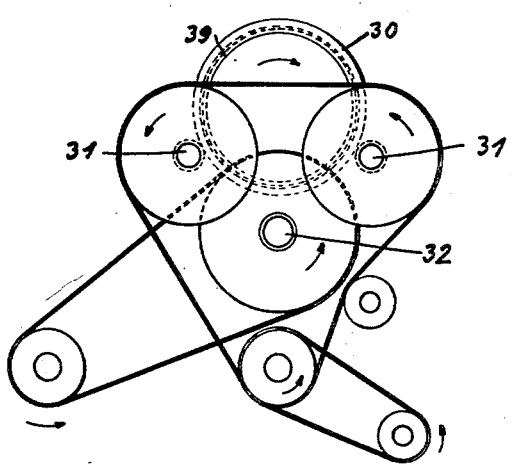
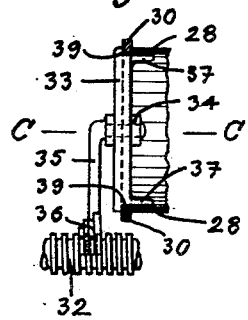
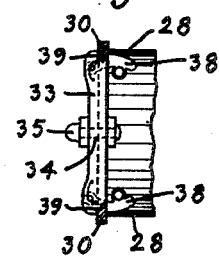
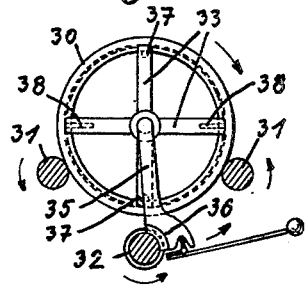

Patented Sept. 14, 1954

2,688,766

UNITED STATES PATENT OFFICE 2,688,766

METHOD AND APPARATUS FOR PRODUCING AND DRYING SYNTHETIC SAUSAGE CASINGS

Gebhard Johannes Huckfeldt, Uetersen, Schleswig-Holstein, Germany

Application February 17, 1950, Serial No. 144,678

Claims priority, application Germany February 21, 1949

9 Claims. (Cl. 18—1)

This invention relates to a method of and an apparatus for producing synthetic sausage skins, particularly sheep or hog casings, from an animal fibrous swollen mass. It is known to produce synthetic sausage skins from an animal fibrous mass by bringing a swollen mass, produced in water or in an aqueous electrolyte, of comminuted particles, reduced to fibres, of the fibrillary connective tissue of animal skin or similar substances into tubular form, drying, hardening, and after-treating.

In the drying of such tubular structures, considerable shrinking and deformation occurs. It has therefore already been proposed to make such sausage skins by applying the swollen mass from the inside or outside on to rigid or semi-rigid shape-bodies, such as metal tubes, glass tubes, and the like, or fabric tubes and the like, drying it in that form, and then drawing it off the shape-bodies in the form of a dried tube. These methods have the disadvantage that the same shape-body can always be used only for limited lengths of casings and the same casing diameter, so that a factory requires a tremendous number of shape-bodies. In addition, the dried casing can be pulled off the shape-body only with great difficulty and there is considerable wastage during pulling-off through tearing or damage to the walls. These methods have therefore not been able to attain any importance in practice.

It has also already been proposed to produce synthetic sausage casings by bringing the swollen fibrous mass into tube form by extrusion from an annular nozzle having fixed or movable nozzle parts, inflating the tube immediately on its leaving the nozzle by means of air or gas to the desired diameter, and drying, and if desired hardening, the tube during its air-filled condition. The enclosed air thus acts as a mandrel.

Since the freshly produced tube is inflated with air to the desired diameter it may not be torn open or caused to leak by the inflation and during the drying, which lasts at least several hours, and also during transportation if any, only relatively stiff swollen mass of certain quality, having as long fibres as possible, can be used for this method. Certain limitations are therefore imposed on this method in respect of the production of thin-walled casings. Particularly in the production of very thin-walled casings, such as are used for example as substitutes for sheep and hog casings for the manufacture of Vienna sausages, frankfurters, and the like, considerable technical difficulties are known, which are substantially due to the sensitiveness of the thin tube walls. It must furthermore be taken into account that only a short fibred swollen mass can be used for the production of synthetic sheep and hog casings, since the frankfurters or the like made with such casings are consumed by biting off without previously removing the skin. When long-fibred swollen mass is used for the production of sheep or hog casings, the long fibres in the sausage skin will be unagreeable to the consumer at the biting off. This method therefore has the disadvantage that the quality of the mass, the speed of drying, and the inflation pressure make exact adjustment between each other and therefore constant control necessary. Certain limitations are therefore imposed on this method in respect of the production of short-fibred sheep and hog casings.

These disadvantages are to be obviated by the present invention. The object of the invention is a method of and an apparatus for the production of synthetic sausage skins, particularly sheep or hog casings, wherein water-containing fibrous swollen mass of animal origin is formed by extrusion in a forming device with an annular nozzle, and the resulting tubes are dried. According to the present invention the freshly formed tube is deposited in the form of a flat, collapsed band on a solid, smooth support, for example flat slabs, endless belts, tubes, rollers, drums, or the like, dried in that position, then drawn off the support, and in per se known manner hardened, washed, and further treated. The freshly formed tube can be deposited on the drying support without creases if it, for example before its depositing is inflated with air or the like, and the air cushion thus formed within the tube is squeezed out, for example by guide rollers. The collapsed tube remains flat on the smooth surface during drying. After drying, a smooth band is obtained, which appears to be an inseparable unit.

Surprisingly, the walls sticking together when the tube is collapsed to a flat band opens again after drying, if the dried and, if desired, hardened tube is treated with water or other swelling media. The tube can then be opened easily by inflation with air.

The opening of the flat tube band after drying is immediately possible by slightly rubbing at one end of the band and injecting air, if a thin layer of a liquid separating agent was applied to the inner wall surface of the freshly formed tube before collapsing it to a tubular band. Good results are obtained, for example, with an oil-water emulsion, which is obtained from about 10 parts of oil, for example peanut oil, purified paraffin oil, and 90 parts of water.

For the production of sheep or hog casings preferably a swollen mass of small-fibred comminuted cow skin is used. For increasing the transverse strength of the tube, this pressing mass is advantageously first formed inside the forming device by a cylindrical annular passage of small diameter, to a tubular mass body, which then is, likewise still inside the forming device, stretched in its transverse direction by a further annular passage interconnected to the aforesaid annular passage and having a larger diameter, preferably a multiple of that of the previous annular passage of small diameter.

According to the method of the present invention after extruding the tube from a forming device with an annular nozzle, for example, air may be introduced into the interior of the formed tube through a passage in the pierced nozzle head and the tube may be guided over one or more guide rollers. The air within the tube is thus squeezed out at the guide points. The resulting air cushion enables the tube to be collapsed to a band without creases. The freshly formed tube band is thereupon deposited on a suitable support for drying. Naturally the formed tube must not be deflated too violently as the inner walls of the tube would become firmly adhered to one another and could not be separated after drying.

Good results can be achieved if the tube in the form of a flat collapsed band is spirally wound without the windings touching each other, on a cylindrical support, for example a drum or the like, and dried in that form and position. This method has the advantage that the wound flat collapsed tube band cannot move in any direction during its drying.

For carrying out this method a rotating drum may be arranged and laterally displaced in a distance from the annular nozzle untill it is correspondingly filled with a spirally wound tube band, whereupon the drum can be removed for drying and replaced by another drum. It is however also possible to work in a continuous manner. Thus for example, an endless tube band may be deposited continuously on a large drying drum, from which it is continuously drawn off, after a nearly complete rotation, in the dry state. Further, it is also possible to guide a tubular band over a series of conveyer rollers disposed side by side in a drying chamber, and to dry the same during the passage of the band through the drying chamber. In addition, all other drying devices usually employed for the production of transfer foils or transfer films may be used.

In order to obtain good adhesion during drying and easy detachment after drying for the tube band, the supports for the tubular bands or tubular lengths may be conveniently coated before their use with a thin layer of a suitable separating medium, such as is known, for example, in the manufacture of albumen transfer films (coating of molten wax, paraffin, and the like).

According to the method of the invention without great difficulties the production of cylindrical casings free from harmful stresses and with an extremely thin wall thickness is possible, without any danger of tearing or of leakages, and without employing gaseous, rigid or semi-rigid shape-bodies. Also not any adjustment of the relation between the quality of the mass, the drying time, and the air-inflation pressure is required. Also synthetic sausage skins which are to be used as substitutes for sheep or hog casings may be produced in this manner with excellent results.

Contrary to all expectation, the creased points in the freshly formed and flat collapsed tube band during its depositing on the smooth support do not impair the strength of the finished tube, but withstand practically the same stresses as the remainder of the tube wall.

The tubular bands or tube lengths dried according to the method of the present invention, thereupon hardened and washed can be very simply tested for tightness. When marketed, they can easily be opened before or during the manufacture of sausages. The sausage skins produced in this manner, particularly sheep or hog casings, comply with all practical requirements.

In the accompanying drawings by way of example an apparatus for the production of sheep or hog casings by the method of the invention is described.

Figure 4:
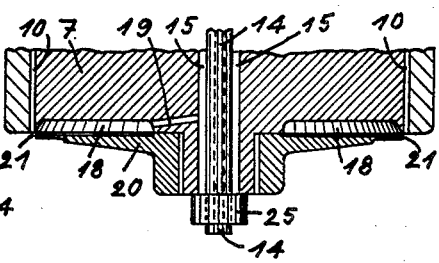
Figure 5:
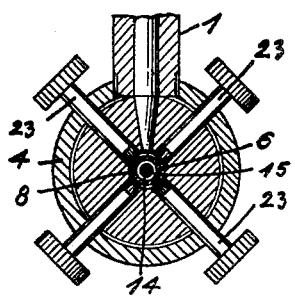
Figure 6:
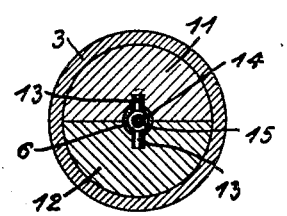

Fig. 1 shows a view of the whole apparatus,

Fig. 2 shows the front view of the same apparatus, without the drive, partly in section, Fig. 3 shows a longitudinal section through the tube forming device, Fig. 4 shows the lower part of the Fig. 3 in a larger scale, Fig. 5 shows a cross-section along the line A—A in Fig. 3, Fig. 6 shows a cross-section along the line B—B in Fig. 3, Fig. 7 shows the gear of Fig. 1 in front elevation, Fig. 8 shows the means for lateral displacement of the drying drum in side view, partly in section view, Fig. 9 shows a sectional view of the same parts as Fig. 8 according to line C—C of Fig. 8, Fig. 10 shows the same parts as in Fig. 8 in front view, partly in cross section.

The comminuted fibrous swollen mass produced in per se known manner is delivered under pressure to the forming device 2 through the pipe 1. The forming device consists of an annular upper part 3 and an annular lower part 4, having both a common centrally disposed cylindrical passage 5. Into this passage 5 is inserted a pipe 6, which is firmly connected at its lower end to a piston-shaped part 7 fitted in the lower part 4. Between the pipe 6 and the lower part 4 and below the supply pipe 1 is formed an annular passage 8 with small diameter. Between the piston shaped part 7 and the lower part 4 is provided a space to form an annular passage 9 with increasing diameter and a tubular annular passage 10 with relatively large diameter. In the passage 8 the pressing mass is formed to a tubular body, which is expanded transversally to the desired width, by being pressed through the following passages 9 and 10, the latter ending in an extruding nozzle.

For preventing longitudinal displacement of the pipe 6 the upper part 3 of the forming device 2 has an annular space for two half-cylindrical parts 11 and 12, each of them having an inner radial projecting pin 13 mounted in different horizontal planes and engaging in corresponding bores in the tube 6.

Within the pipe 6 is concentrically arranged an air supply pipe 14, with an annular space between the two pipes 6 and 14, forming an annular space or passage 15 through which a liquid separating medium, such as oil-water emulsion 17 from a setting-up tank 16 at the upper end of the pipe 14 can flow to the lower end of the pipe 14. To the lower end of the piston-shaped part 7 is secured, for example by means of threads, a plate-shaped disc 20, the periphery 21 of which projects close to the inner wall of the formed tube 22 of mass. Opposite to the disc 20 is provided a recess 18 within the piston-shaped part 7, communicating with the supply passage 15 through a bore 19. The liquid separating medium 17 slowly flows down from the tank 16 through the supply passage 15, the bore 19 into the space 18 and is applied in a thin layer at 21 on to the inner wall surface of the formed tube 22 when it is just leaving the annular nozzle gap at the lower end of the passage 10. At the same time the inner edge of the nozzle gap is finely lubricated by the liquid separating medium, and hence the danger of blockage and of thickening of the wall of the formed tube 22 is reduced or avoided.

For ensuring uniform wall-thickness of the formed tube 22 of mass, four radial centering screws 23 at the lower part of the pipe 6 within the annular passage 8 are provided. The air supply pipe 14 is conveniently strengthened at its upper end for connection with the air supply hose 24. The lower end of the passage 15 is closed, for example by a sleeve 25, slipped over the projecting end of the pipe 14.

The freshly formed tube 22 leaving the annular nozzle gap at 21 is inflated with air out of the central pipe 14 and guided over one or more resiliently mounted, vertically and laterally adjustable rollers, for example an air squeezing roller 26 and a guide roller 27, to the drying drum 28, and spirally wound thereon in the form of a flat band 29.

The drying drum 28 is provided at its ends with flanges 30, for example with a distance of about 2 metres and has such a diameter that about 30 to 40 metres of tubular band can be accommodated thereon by spirally winding. In frictional connection with the flanges 30 are arranged longitudinal rollers 31, which bear the drum and cause its rotation. For lateral displacement of the drum 28 a threaded spindle 32 is arranged parallel to the drum 28, which has at one end a transporting device engaging in the threads of the spindle 32. The transporting device consists in a rigid part 33 removably connected to one end of the drum 28, having a central bore 34 and a rigid arm 35 rotatably mounted in the central bore 34. The free end of that arm 35 is provided with threads 36 tooth-like means or the like engaging in the threads of the spindle 32.

The driving and regulation of the speed of rotation of the rollers 31 and of the threaded spindle 32 are effected in per se known manner through an intermediate gearing driven by a motor, while the speed of stripping of the formed tube of mass is made rather greater than the speed of forming the tube of mass in the forming device 2 by pressing, for the purpose thereby also to reduce the wall thickness of the tube. The embodiments shown and described may undergo numerous modifications in order to adapt it to any particular use without departing from the scope of the invention.

I claim:

1. A method of producing thin-walled tubes from water-containing fibrous swollen mass of animal origin and drying them in a flattened condition comprising pressing said mass through a forming device and extruding said mass from a tubular nozzle to form a tube, applying a film of a liquid separating medium to the inner wall of said freshly formed tube, injecting air at said nozzle into said tube, squeezing the air out of the tube by guiding it over staggered rollers, helically winding said collapsed tube in form of a flat band on the smooth surface of a drum, which has been coated with a film of a slightly adhesive separating medium, so that said band adheres to said surface, drying said band while it adheres to said surface and after drying drawing it off for further treatment.

2. A method for producing a thin walled tubular sausage casing from a water containing fibrous mass comprising in combination, the steps of extruding the mass to form a tube; applying to the inner surface of the thus formed tube at the time of extrusion thereof a film of a separating medium covering the inner tube surface and preventing opposite inner tube surface portions to directly contact each other and to adhere; injecting a gaseous medium into said tube so as to fill the same and to smooth wrinkles in the wall of the same; collapsing the thus smoothed tube so that the same is substantially band-shaped and consists of two wrinkle-free strip-shaped superimposed sheet portions of the water containing fibrous mass integrally connected along the longitudinal edges thereof and separated from each other by said separating medium; winding said band-shaped collapsed tube onto a rotating support having a smooth surface with one sheet portion thereof superimposed upon said supporting surface and adhesively attaching said sheet portion to said supporting surface; drying said band-shaped collapsed tube on said support so as to prevent shrinking; removing the thus dried and solidified band-shaped collapsed tube from said rotating support; moistening said band-shaped collapsed tube; and inflating said band-shaped collapsed tube in order to separate said superimposed films of said tacky substance, and to space said strip-shaped portions from each other so as to form a dry wrinkle-free tube.

3. A method for producing a thin walled tubular sausage casing from a water containing fibrous mass comprising in combination, the steps of extruding the mass to form a tube; applying to the inner surface of the thus formed tube at the time of extrusion thereof a film of a separating medium covering the inner tube surface and preventing opposite inner tube surface portions to directly contact each other and to adhere; injecting a gaseous medium into said tube so as to fill the same and to smooth wrinkles in the wall of the same; collapsing the thus smoothed tube so that the same is substantially band-shaped and consists of two wrinkle-free strip-shaped superimposed sheet portions of the water containing fibrous mass integrally connected along the longitudinal edges thereof and separated from each other by said separating medium; applying a coating of a tacky molten waxy substance to the surface of a rotatable support; winding said band-shaped collapsed tube onto said surface of said support; drying said band-shaped collapsed tube adhering to said support so as to prevent shrinking; removing the thus dried and solidified band-shaped collapsed tube from said rotating support; moistening said band-shaped collapsed tube; and inflating said band-shaped collapsed tube in order to space said strip-shaped portions from each other so as to form a dry wrinkle-free tube.

4. An apparatus for producing thin-walled tubular sausage casings from a water containing fibrous mass, comprising, in combination, an extrusion means having an annular opening for extruding the mass in the form of a tube; air injecting means mounted on said extruding means surrounded by said annular opening and adapted to inject air into an extruded tube; roller means located spaced from said extruding means and adapted to collapse an extruded tube filled by air supplied by said air injecting means so that no air passes beyond said roller means, and the collapsed tube is band-shaped and comprises two superimposed strip-shaped wrinkle-free portions; nozzle means mounted on said extrusion means within said annular opening and adapted to apply a film of a separating medium to the inner surface of said extruded tube; a rotatable supporting drum having a smooth surface and adapted to wind said collapsed tube onto said surface during rotation thereof; means for applying a slightly adhesive coating to said smooth surface of said drum so that said collapsed tube adheres thereto; and drying means for drying said collapsed tube while being wound on said drum.

5. A method for producing a thin walled tubular sausage casing from a water containing fibrous mass, comprising, in combination, the steps of extruding the mass to form a tube; introducing a fluid into said tube so as to circumferentially expand the same and to smooth wrinkles in the wall of the same; collapsing the thus smoothed tube so that the same is substantially band-shaped and consists of two wrinkle-free strip-shaped superimposed sheet portions of the water-containing fibrous mass which are integrally connected along the longitudinal edges thereof; placing said band-shaped collapsed tube on a smooth supporting surface with one sheet portion thereof superimposed upon said supporting surface and adhesively attaching said sheet portion to said supporting surface; drying said collapsed tube attached to said smooth surface so as to solidify the fibrous mass; and drawing off the thus dried and solidified collapsed tube from said smooth surface for further treatment.

6. A method for producing a thin walled tubular sausage casing from a water containing fibrous mass, comprising, in combination, the steps of extruding the mass to form a tube; introducing a fluid into said tube so as to circumferentially expand the same and to smooth wrinkles in the wall of the same; collapsing the thus smoothed tube so that the same is substantially band-shaped and consists of two wrinkle-free strip-shaped superimposed sheet portions of the water-containing fibrous mass which are integrally connected along the longitudinal edges thereof; coating a smooth supporting surface with a film of a slightly adhesive separating medium; placing said band-shaped collapsed tube on said thus coated smooth supporting surface with one sheet portion thereof superimposed upon said supporting surface; drying said collapsed tube attached to said smooth surface so as to solidify the fibrous mass; and drawing off the thus dried and solidified collapsed tube from said smooth surface for further treatment.

7. A method according to claim 1 wherein said liquid separating medium is an oil-water solution.

8. A method according to claim 1 wherein said liquid separating medium is an oil-water emulsion containing 10 parts of oil and 90 parts of water.

9. An apparatus for producing thin walled tubular sausage casings from a water-containing fibrous mass, comprising, in combination, an extrusion means having a front face formed with an annular opening for extruding the mass in the form of a tube; air injecting means in said extruding means surrounded by said annular opening; annular passage means for supplying a liquid separating medium located in said extruding means; means arranged spaced from said extruding means and adapted to collapse an extruded tube filled by air supplied by said air injecting means so that the collapsed tube is band-shaped; a rotatable supporting drum having a smooth surface and adapted to wind said collapsed tube onto said surface during rotation thereof; drying means for drying said collapsed tube on said drum; and a disc secured to said extrusion means within said annular opening and having an annular rim projecting to said annular opening and defining with said front face of said extrusion means an annular gap, said rim being adapted to be located close to the inner surface of an extruded tube, said front face of said extrusion means being formed with an annular recess located oppositely said disc and communicating with said annular gap, said extrusion means being formed with a bore connecting said passage means with said annular recess so that said liquid separating medium passes into said recess and through said annular gap for being applied to the inner surface of said tube.

References Cited in the file of this patent

UNITED STATES PATENTS

| Number | Name | Date |
|---|---|---|
| 1,544,255 | Maynard | June 30, 1925 |
| 1,643,999 | Semple | Oct. 4, 1927 |
| 2,070,252 | Borner | Feb. 9, 1937 |
| 2,136,566 | Schnecko et al. | Nov. 15, 1938 |
| 2,176,925 | Reichel et al. | Oct. 24, 1939 |
| 2,246,236 | Becker | June 17, 1941 |
| 2,256,040 | Becker et al. | Sept. 16, 1941 |
| 2,307,614 | Becker | Jan. 5, 1943 |